United States Patent
Kim et al.

(10) Patent No.: US 8,754,555 B2
(45) Date of Patent: Jun. 17, 2014

(54) ROTATING MEMBER ASSEMBLY AND SPINDLE MOTOR INCLUDING THE SAME

(75) Inventors: Hyuk Joo Kim, Gyunggi-do (KR); Bum Cho Kim, Gyunggi-do (KR); Ta Kyoung Lee, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 43 days.

(21) Appl. No.: 13/530,955

(22) Filed: Jun. 22, 2012

(65) Prior Publication Data

US 2013/0241332 A1 Sep. 19, 2013

(30) Foreign Application Priority Data

Mar. 19, 2012 (KR) ........................ 10-2012-0027774

(51) Int. Cl.
*H02K 7/00* (2006.01)
*H02K 5/00* (2006.01)
*H02K 11/00* (2006.01)

(52) U.S. Cl.
USPC .......................................... 310/68 R; 310/90

(58) Field of Classification Search
CPC . G11B 19/2009; H02K 21/22; H02K 5/1672; F16C 33/107
USPC .................................................. 310/90, 67 R
See application file for complete search history.

(56) References Cited

U.S. PATENT DOCUMENTS

| | | | | |
|---|---|---|---|---|
| 2002/0109421 | A1* | 8/2002 | Horng et al. | 310/67 R |
| 2002/0169421 | A1* | 11/2002 | McWethy et al. | 604/192 |
| 2002/0180290 | A1* | 12/2002 | Takayanagi | 310/90 |
| 2009/0261672 | A1* | 10/2009 | Horng et al. | 310/90 |
| 2009/0309438 | A1* | 12/2009 | Horng et al. | 310/90 |
| 2011/0192210 | A1* | 8/2011 | Yamashita et al. | 72/356 |
| 2011/0200279 | A1* | 8/2011 | Goto | 384/107 |
| 2013/0162113 | A1* | 6/2013 | Vedy | 310/68 B |

FOREIGN PATENT DOCUMENTS

| | | |
|---|---|---|
| KR | 10-0786615 | 12/2007 |
| KR | 10-2010-0135015 | 12/2010 |

* cited by examiner

*Primary Examiner* — Terrance Kenerly

(57) ABSTRACT

There are provided a rotating member assembly and a spindle motor including the same. The rotating member assembly includes: a shaft including an outer surface step part provided in an outer surface thereof; and a rotor hub including an insertion hole into which the shaft is inserted, the insertion hole including an inner surface step part provided in an inner surface thereof and corresponding to the outer surface step part, such that the inner surface step part and the outer surface step part are fittingly-coupled to each other.

10 Claims, 6 Drawing Sheets

ROTATING MEMBER ASSEMBLY AND SPINDLE MOTOR INCLUDING THE SAME

CROSS-REFERENCE TO RELATED APPLICATIONS

This application claims the priority of Korean Patent Application No. 10-2012-0027774 filed on Mar. 19, 2012, in the Korean Intellectual Property Office, the disclosure of which is incorporated herein by reference.

BACKGROUND OF THE INVENTION

1. Field of the Invention

The present invention relates to a rotating member assembly and a spindle motor including the same.

2. Description of the Related Art

A hard disk drive (HDD), an information storage device, reads data stored on a disk or writes data to a disk using a read/write head.

A hard disk drive requires a disk drive device capable of driving the disk. In the disk drive device, a small-sized spindle motor is commonly used.

This small-sized spindle motor has used a hydrodynamic bearing assembly. A lubricating fluid is interposed between shaft, a rotating member of the hydrodynamic bearing assembly, and a sleeve, a fixed member thereof, such that the shaft is supported by fluid dynamic pressure generated in the lubricating fluid.

In addition, a rotor hub rotating together with the shaft and having a recording disk mounted thereon is mounted on an upper portion of the shaft. The rotor hub is fixedly coupled to the upper portion of the shaft and has a disk shape in which it is extended in a radial direction based on the shaft.

Here, the shaft may have a step, such that the rotor hub may be fittingly-coupled to an upper portion of the step in a state in which the upper portion of the shaft has a diameter larger than that of a lower portion thereof based on the step.

In addition, fixed members such as a sleeve, and the like, are provided outwardly of the shaft and a lower portion of the rotor hub to form the spindle motor.

In the spindle motor having this structure, the rotor hub has force, biased in a downward axial direction by load of the rotor hub itself and load of the disk, applied thereto. This rotor hub generates force lifting the shaft by the principle of a lever, using a fixed member such as the sleeve, or the like, as a support. However, floating of the shaft in an upward axial direction is limited by a stopper, or the like, such that the shaft has tensile force applied thereto. In the case in which the tensile force is excessive, the shaft may be shear-fractured or broken.

Further, since the rotor hub is fixed to the shaft in a state in which it is held on the step of the shaft, load may act on the step in the downward axial direction, causing a deformation in the shape of the shaft.

A coupling structure between a shaft and a hub has been disclosed in the following Related Art Document. In the coupling structure between the shaft and the hub disclosed in the following Related Art Document, a step is not formed in a coupling surface between the shaft and the hub, such that the shaft may be damaged.

RELATED ART DOCUMENT (Patent Document 1) Japanese Patent Laid-open Publication No. 2006-082252

SUMMARY OF THE INVENTION

An aspect of the present invention provides a spindle motor capable of preventing fractures or deformation of a shaft by changing a coupling structure between the shaft and a rotor hub to significantly reduce an amount of axial force applied to the shaft.

According to an aspect of the present invention, there is provided a rotating member assembly including: a shaft including an outer surface step part provided in an outer surface thereof; and a rotor hub including an insertion hole into which the shaft is inserted, the insertion hole including an inner surface step part provided in an inner surface thereof and corresponding to the outer surface step part, such that the inner surface step part and the outer surface step part are fittingly-coupled to each other.

The outer surface step part may be provided as a step formed in a direction perpendicular to a length direction of the shaft, and the inner surface step part may be provided as a step formed in the rotor hub in a radial direction thereof.

The outer surface of the shaft may be divided into a first outer surface part on an upper portion thereof and a second outer surface part on a lower portion thereof, based on the outer surface step part, and the inner surface of the rotor hub may be divided into a first inner surface part on an upper portion thereof and a second inner surface part on a lower portion thereof, based on the inner surface step part. The first outer surface part may be fittingly-coupled to the first inner surface part and the second outer surface part may be fittingly-coupled to the second inner surface part.

The second outer surface part facing a lower end portion of the second inner surface part may be provided with an avoidance unit so as to prevent contact with the lower end portion of the second inner surface part.

The avoidance unit may be an avoidance groove provided in the second outer surface part facing the lower end portion of the second inner surface part.

The second outer surface part may have the same diameter in upper and lower portions based on the avoidance groove.

The second outer surface part may have a diameter larger in a lower portion thereof than in an upper portion thereof, based on the avoidance groove.

The second outer surface part facing a lower end portion of the second inner surface part may be provided with an additional step part so as to prevent contact with the lower end portion of the second inner surface part.

The second outer surface part may have a diameter larger in an upper portion thereof than in a lower portion thereof, based on the additional step part.

The shaft and the rotor hub may include an adhesive provided therebetween.

A lower end portion of the first outer surface part may be provided with a collection groove collecting an adhesive.

According to another aspect of the present invention, there is provided a spindle motor including: the rotating member assembly as described above; and a sleeve having a shaft hole so that the shaft of the rotating member assembly is rotatably fitted thereinto, and forming a bearing clearance with the shaft, the a bearing clearance filled with a lubricating fluid.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Embodiments of the present invention will now be described in detail with reference to the accompanying drawings. However, it should be noted that the spirit of the present invention is not limited to the embodiments set forth herein and that those skilled in the art and understanding the present invention could easily accomplish retrogressive inventions or other embodiments included in the spirit of the present invention by the addition, modification, and removal of components, but those are to be construed as being included in the spirit of the present invention.

Further, detailed descriptions related to well-known functions or configurations will be ruled out in order not to unnecessarily obscure subject matters of the present invention.

Figure 1:
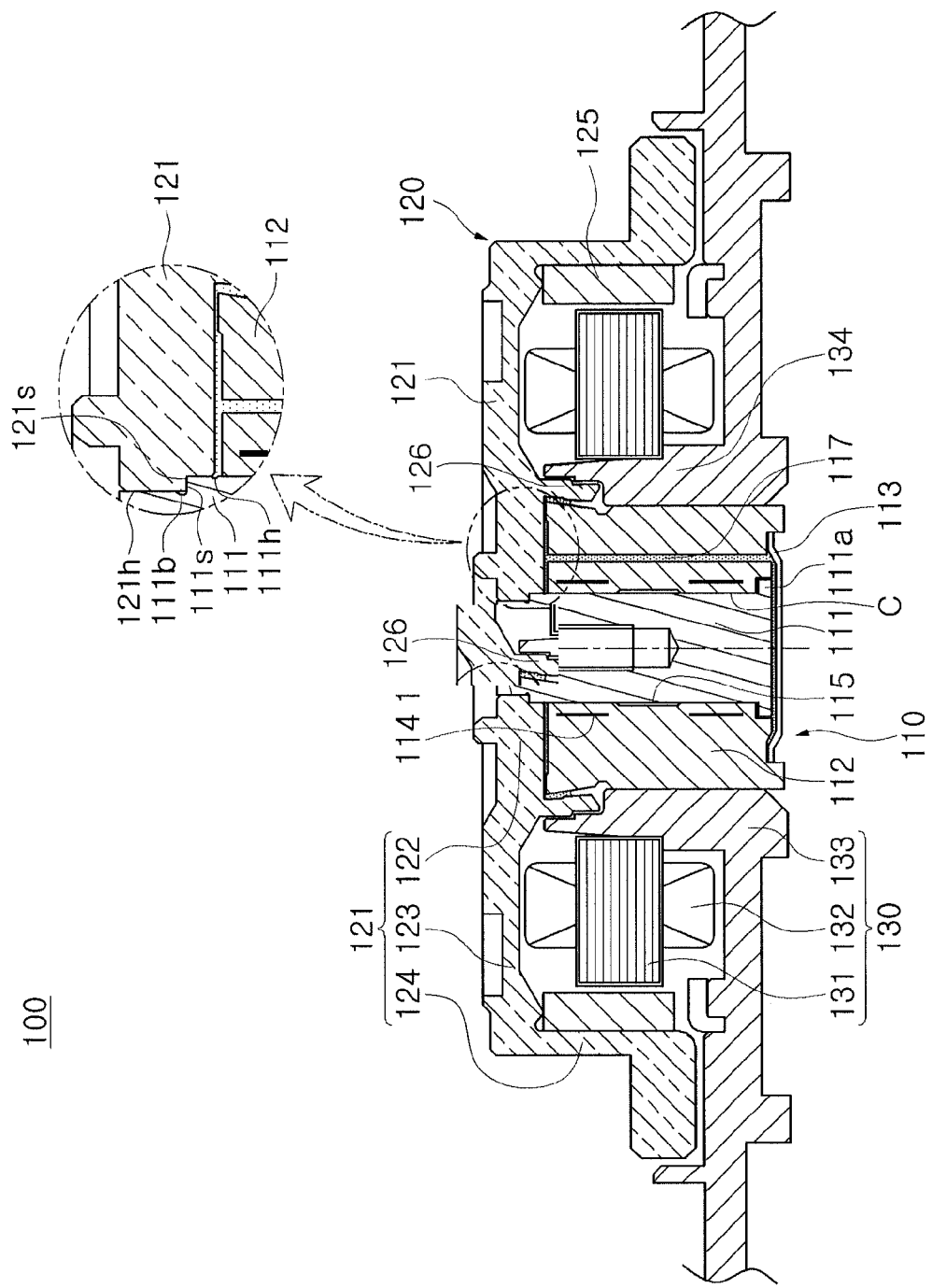
FIG. 1 is a schematic cross-sectional view showing a spindle motor according to an embodiment of the present invention.
Figure 2:
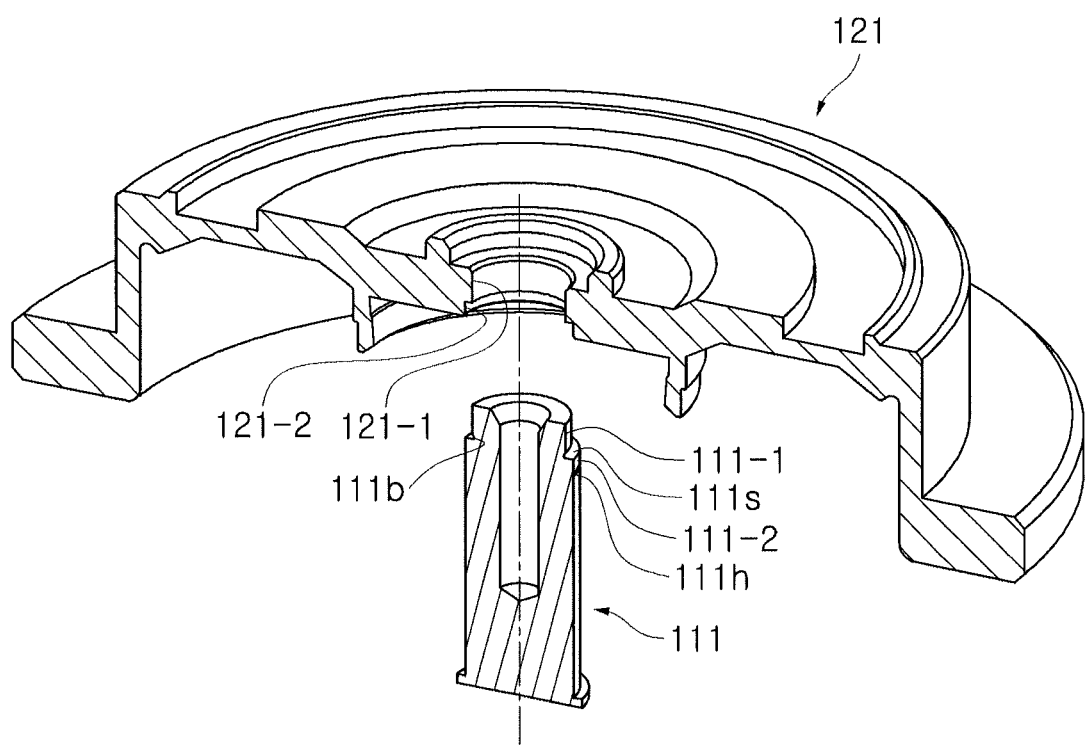
FIG. 2 is an exploded partially cut-away perspective view showing a rotating member assembly used in the embodiment of the present invention.

FIG. 1 is a schematic cross-sectional view showing a spindle motor according to an embodiment of the present invention; and FIG. 2 is an exploded perspective view showing a rotating member assembly used in the embodiment of the present invention.

Referring to FIGS. 1 and 2, a spindle motor 100 according to the embodiment of the present invention may include a hydrodynamic bearing assembly 110 including a shaft 111 and a sleeve 112, a rotor 120 including a rotor hub 121, and a stator 130 including a core 131 having a coil 132 wound therearound.

The hydrodynamic bearing assembly 110 may include the shaft 111, the sleeve 112, a stopper 111a, and the rotor hub 121, wherein the rotor hub 121 may be a component configuring the hydrodynamic bearing assembly 110 while simultaneously being a component configuring the rotor 120, to be described below.

In addition, a rotating member assembly may include the shaft 111 and the rotor hub 121 mounted thereon.

Terms with respect to directions will first be defined. As viewed in FIG. 1, an axial direction refers to a vertical direction based on the shaft 111, and an outer radial direction or an inner radial direction refers to a direction toward an outer edge of the rotor hub 121 based on the shaft 111, or a direction toward the center of the shaft 111 based on the outer edge of the rotor hub 121.

Further, in the following description, rotating members may include the shaft 111, the rotor 120 including the rotor hub 121, the magnet 125 mounted on the rotor 120, and the like, while fixed members, members other than the rotating members, may include the sleeve 112, the stator 130, a base member 133, and the like.

In addition, a communication path between an interface of a lubricating fluid and the outside refers to a path through which the interface of the lubricating fluid is connected to the outside of the spindle motor and may have air introduced and discharged therethrough.

The sleeve 112 may support the shaft ill so that an upper end portion of the shaft 111 is protruded in an upward axial direction. The sleeve 112 may be formed by sintering a Cu—Fe-based alloy powder or an SUS-based powder. However, the sleeve is not limited to being manufactured by the above-mentioned method, and may be manufactured variously.

In this configuration, the shaft 111 may be inserted into a shaft hole of the sleeve 112 to have a micro clearance with the shaft hole of the sleeve 112 to serve as a bearing clearance C. This bearing clearance C may be filled with the lubricating fluid, and stable rotation of the rotor 120 may be supported by upper and lower radial dynamic pressure grooves 114 formed in at least one of an outer diameter of the shaft 111 and an inner diameter of the sleeve 110.

The radial dynamic pressure grooves 114 may be formed in an inner surface of the sleeve 112, an inner portion of the shaft hole of the sleeve 112, and generate pressure so that the shaft 111 may rotate smoothly in a state in which the shaft 111 is spaced apart from the sleeve 112 by a predetermined interval at the time of rotation thereof.

However, the radial dynamic pressure groove 114 is not limited to being formed in the inner surface of the sleeve 112 as described above, but may also be formed in an outer diameter portion of the shaft 111. In addition, the number of radial dynamic pressure grooves 114 is not limited.

Here, the radial dynamic pressure groove 114 may have at least one of a herringbone shape, a spiral shape, and a helix shape. However, the radial dynamic pressure groove 114 may have any shape as long as radial dynamic pressure may be generated thereby.

The sleeve 112 may include a circulation hole 117 formed therein so as to allow for communication between upper and lower portions thereof and to allow for pressure in the lubricating fluid in an inner portion of the hydrodynamic bearing assembly 110 to be dispersed thereby, thereby maintaining pressure uniformity, and may allow air bubbles, or the like, present in the inner portion of the hydrodynamic bearing assembly 110, to move so as to be discharged by circulation.

Here, a lower end portion of the sleeve 112 may receive the stopper 111a protruded from a lower end portion of the shaft 111 in the outer radial direction, and the stopper 111a may be caught by a lower end surface of the sleeve 112 to limit floating of the shaft 111 and the rotor 120.

The spindle motor 100 according to the embodiment of the present invention uses a fluid bearing. Generally, the spindle motor may include a pair of upper and lower radial dynamic pressure grooves 114 for rotational stability to allow two fluid bearings to be formed. However, in the case of the motor using the hydrodynamic bearing, since the rotating member needs to rotate in a state in which it is floated at a predetermined height and thus not in contact with a bottom plate (a base cover 113 in the present embodiment), the lubricating fluid may be continuously pumped in the downward axial direction.

Meanwhile, a groove shaped reservoir part 115 may be formed in at least one of the sleeve 112 and the shaft ill between the upper and lower radial dynamic pressure grooves 114 so that the bearing clearance between the sleeve 112 and the shaft 111 is wider than other portions. Although FIG. 1 shows that the reservoir part 115 is formed in an inner peripheral surface of the sleeve 112 in a circumferential direction, the present invention is not limited thereto. That is, the reservoir part 115 may be formed in the outer peripheral surface of the shaft 111 in the circumferential direction.

Meanwhile, the sleeve 112 may include the base cover 113 coupled thereto at a lower portion thereof in the axial direction, having a clearance therebetween. The clearance receives the lubricating fluid therein.

The base cover 113 may receive the lubricating fluid in the clearance formed between the base cover 113 and the sleeve 112 to serve as a bearing supporting a lower surface of the shaft 111.

The rotor hub 121, a rotating member coupled to the shaft 111 and rotating together therewith, may configure the rotor 120 while simultaneously configuring the hydrodynamic bearing assembly 100. Hereinafter, the rotor 120 will be described in detail.

The rotor 120 is a rotating structure provided to be rotatable with respect to the stator 130 and may include the rotor hub 121 having an annular ring-shaped magnet 125 provided on an inner peripheral surface thereof, wherein the annular ring-shaped magnet 125 and the core 131 have a predetermined interval therebetween.

In other words, the rotor hub 121 may be a rotating member coupled to the shaft 111 to rotate together therewith. Here, the shaft 111 and the rotor hub 121 may include an adhesive provided therebetween to thereby be fixed to each other. However, the shaft 111 and the rotor hub 121 are not limited to being fixed to each other in the above-mentioned scheme, but may be fixed to each other in various fixing schemes such as welding, press-fitting, and the like.

Further, in the case in which the shaft 111 and the rotor hub 121 are fixed to each other using the adhesive, a lower end portion of a first outer surface part 111-1 of the shaft 111 to be described below may be provided with a collection groove 111b collecting the adhesive.

Here, the magnet 125 may be a permanent magnet generating magnetic force having a predetermined strength by alternately magnetizing an N pole and an S pole thereof in a circumferential direction.

In addition, the rotor hub 121 may include a first cylindrical wall part 122 fixed to the upper end portion of the shaft 111, a disk part 123 extended from an end portion of the first cylindrical wall part 122 in the outer radial direction, and a second cylindrical wall part 124 protruded downwardly from an end portion of the disk part 123 in the outer radial direction, and the second cylindrical wall part 124 may include the magnet 125 coupled to an inner peripheral surface thereof.

The rotor hub 121 may have a main wall part 126 extended in the downward axial direction so as to correspond to an upper outer portion of the sleeve 112. More specifically, the rotor hub 121 may include the main wall part 126 extended from the disk part 123 in the downward axial direction. A liquid-vapor interface sealing the lubricating fluid may be formed between the outer surface of the sleeve 112 and an inner surface of the main wall part 126.

In addition, an inner surface of the main wall part 126 may be tapered, such that an interval between the inner surface of the main wall part 126 and the outer surface of the sleeve 112 is gradually enlarged in the downward axial direction to facilitate the sealing of the lubricating fluid. Further, the outer surface of the sleeve 112 may also be tapered to facilitate the sealing of the lubricating fluid.

Furthermore, an outer surface of the main wall part 126 may correspond to at least a portion of a mounting part 134 protruded upwardly from the base member 133.

The shaft 111 and the rotor hub 121 in the rotating member assembly of the spindle motor 100 according to the embodiment of the present invention may be coupled to each other by forming an outer surface step part 111s at the outer surface of the shaft 111, forming an inner surface step part 121s at an inner surface of an insertion hole 121h of the rotor hub 121 fitted onto the outer surface step part 111s, and fittingly-coupling the respective step parts to correspond to each other.

That is, the outer surface step part 111s of the shaft 111 may be provided as a step formed in a direction perpendicular to the length direction of the shaft 111, and the inner surface step part 121s of the rotor hub 121 may be provided as a step formed in the rotor hub 121 in a radial direction thereof.

Therefore, the outer surface of the shaft 111 may be divided into a first outer surface part 111-1 on an upper portion thereof and a second outer surface part 111-2 on a lower portion thereof, based on the outer surface step part 111s, while the inner surface of the rotor hub 121 may be divided into a first inner surface part 121-1 on an upper portion thereof and a second inner surface part 121-2 on a lower portion thereof, based on the inner surface step part 121s, and the first outer surface part 111-1 may be fittingly-coupled to the first inner surface part 121-1 and the second outer surface part 111-2 may be fittingly-coupled to the second inner surface part 121-2.

Through the above-mentioned structure, the shaft 111 and the rotor hub 121 may include the respective step parts, such that the first and second surface parts, provided on the upper and lower portions thereof based on the step parts, may be coupled to each other while facing each other. Therefore, axial force capable of acting on the shaft 111 may be dispersed, such that the axial force applied to the shaft 111 is significantly reduced, whereby fractures or deformation of the shaft 111 may be effectively prevented. In addition, according to the present embodiment, since the outer surface step part 111s of the shaft 111 is provided between the first and second outer surface parts 111-1 and 111-2, deformation of the shape of the step part and the shape of the shaft due to the axial force may be prevented.

Meanwhile, in the spindle motor 100 according to the embodiment of the present invention, the second outer surface part 111-2 facing a lower end portion of the second inner surface part 121-2 may be provided with an avoidance unit so as to prevent contact with the lower end portion of the second inner surface part. The avoidance unit prevents contact between the lower end portion of the rotor hub 121 and the shaft 111, whereby the deformation of the shape of the shaft 111 may be prevented. Here, the second outer surface part 111-2 of the shaft 111 may have the entirely constant diameter.

Here, the avoidance unit may be an avoidance groove 111h provided in the second outer surface part 111-2 of the shaft 111 facing the lower end portion of the second inner surface part 121-2. The avoidance groove 111h may be provided in the circumferential direction along an outer circumference of the shaft 111.

The stator 130 may include the coil 132, the core 131, and the base member 133.

In other words, the stator 130 may be a fixed structure including the coil 132 generating electromagnetic force having a predetermined magnitude at the time of the application of power and the plurality of cores 131 having the coil 132 wound therearound.

The core 131 may be fixedly disposed on an upper portion of the base member 133 including a printed circuit board (not shown) having pattern circuits printed thereon, the upper surface of the base member 133 corresponding to the winding coil 132 may include a plurality of coil holes having a predetermined size and penetrating through the base member 133 so as to expose the winding coil 132 downwardly, and the winding coil 132 may be electrically connected to the printed circuit board (not shown) so that external power can be supplied thereto.

The outer peripheral surface of the sleeve 112 may be fixed to the base member 133, and the core 131 having the coil 132 wound therearound may be inserted into the base member 133. In addition, the base member 133 and the sleeve 112 may be connected to each other by applying an adhesive to an inner surface of the base member 133 or an outer surface of the sleeve 112.

In addition, the base member 133 may be provided with the mounting part 134 protruded in the upward axial direction, such that the core 131 may be mounted on an outer surface of the mounting part 134, the sleeve 112 may be fitted into and fixed to a portion of an inner surface of the mounting part 134, and an outer surface of the main wall part 126 may correspond to another portion of the inner surface of the mounting part 134. The mounting part 134 may be formed without having a portion corresponding to the outer surface of the main wall part 126.

Figure 3:
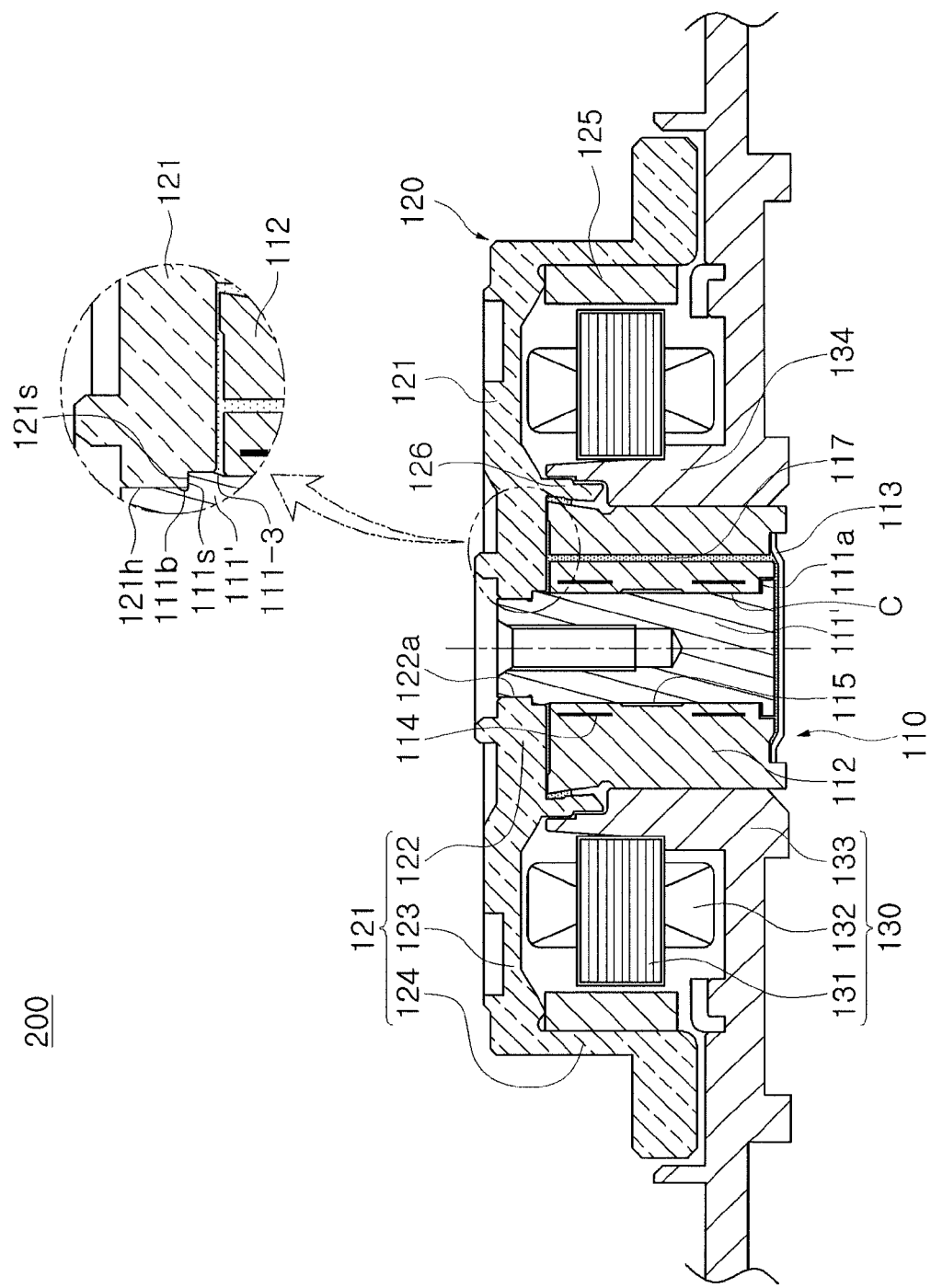
FIG. 3 is a schematic cross-sectional view showing a spindle motor according to another embodiment of the present invention.
Figure 4:
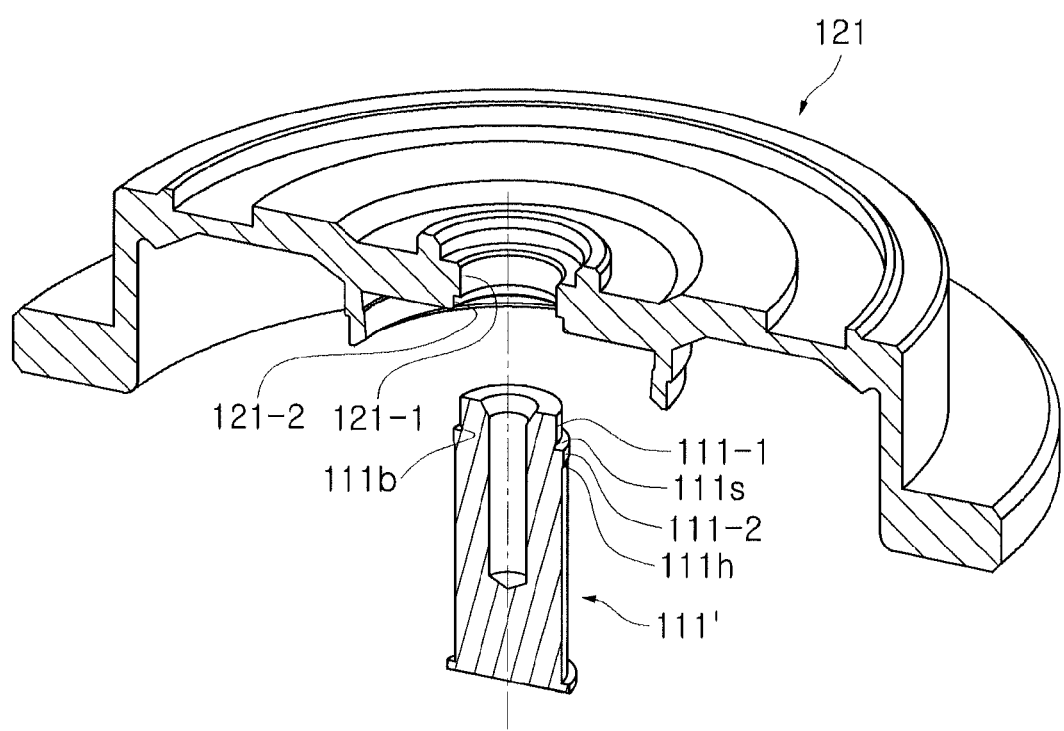
FIG. 4 is an exploded partially cut-away perspective view showing a rotating member assembly used in another embodiment of the present invention.

FIG. 3 is a schematic cross-sectional view showing a spindle motor according to another embodiment of the present invention; and FIG. 4 is an exploded perspective view showing a rotating member assembly used in another embodiment of the present invention.

Referring to FIGS. 3 and 4, a spindle motor 200 according to another embodiment of the present invention may include the hydrodynamic bearing assembly 110 including a shaft 111' and the sleeve 112, the rotor 120 including the rotor hub 121, and the stator 130 including the core 131 having the coil 132 wound therearound.

The spindle motor 200 according to this embodiment of the present invention has substantially the same configuration as that of the spindle motor 100 according to the above-described embodiment of the present invention, except for a structure of a coupling part between the shaft and the rotor hub. Therefore, a detailed description thereof will be omitted. Hereinafter, features different from those described in the aforementioned embodiment of the present invention will be mainly described.

In the shaft 111' used in the spindle motor 200 according to this embodiment of the present invention, the second outer surface part 111-2 facing a lower end portion of the second inner surface part 121-2 may be provided with an avoidance unit so as to prevent contact with the lower end portion of the second inner surface part 121-2. The avoidance unit prevents contact between the lower end portion of the rotor hub 121 and the shaft 111', whereby deformation of the shape of the shaft 111' may be prevented.

Here, the avoidance unit may include an additional step part 111-3 provided in the second outer surface part 111-2 of the shaft ill facing the lower end portion of the second inner surface part 121-2. That is, an upper portion of the second outer surface part 111-2 facing the second inner surface part 121-2 may be provided with the additional step part 111-3 in order that the lower end portion of the second inner surface part 121-2 does not contact the second outer surface part 111-2, such that the second outer surface part 111-2 of the shaft 111' may have a diameter larger in an upper portion thereof than in a lower portion thereof based on the additional step part 111-3.

Figure 5:
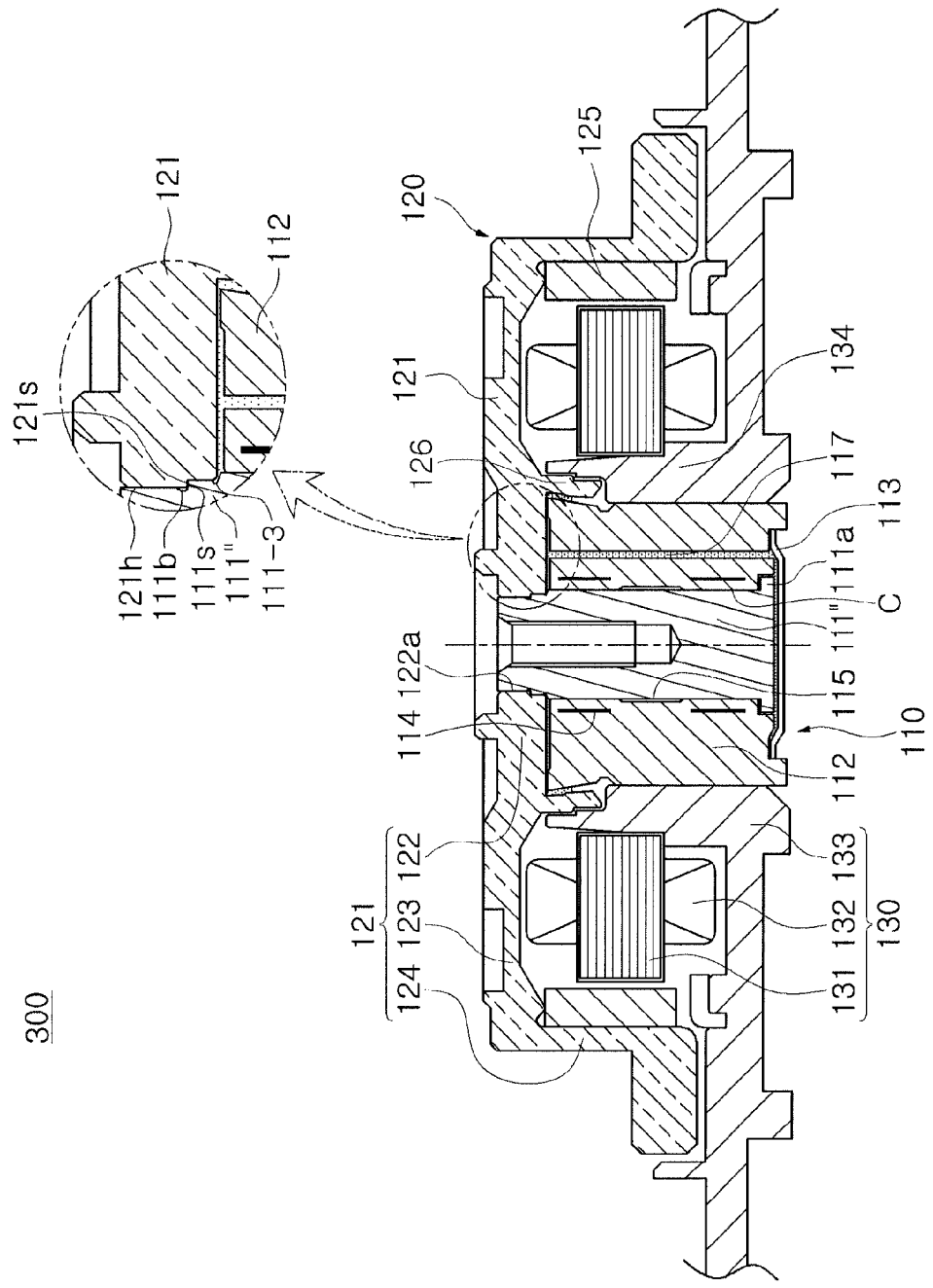
FIG. 5 is a schematic cross-sectional view showing a spindle motor according to another embodiment of the present invention.
Figure 6:
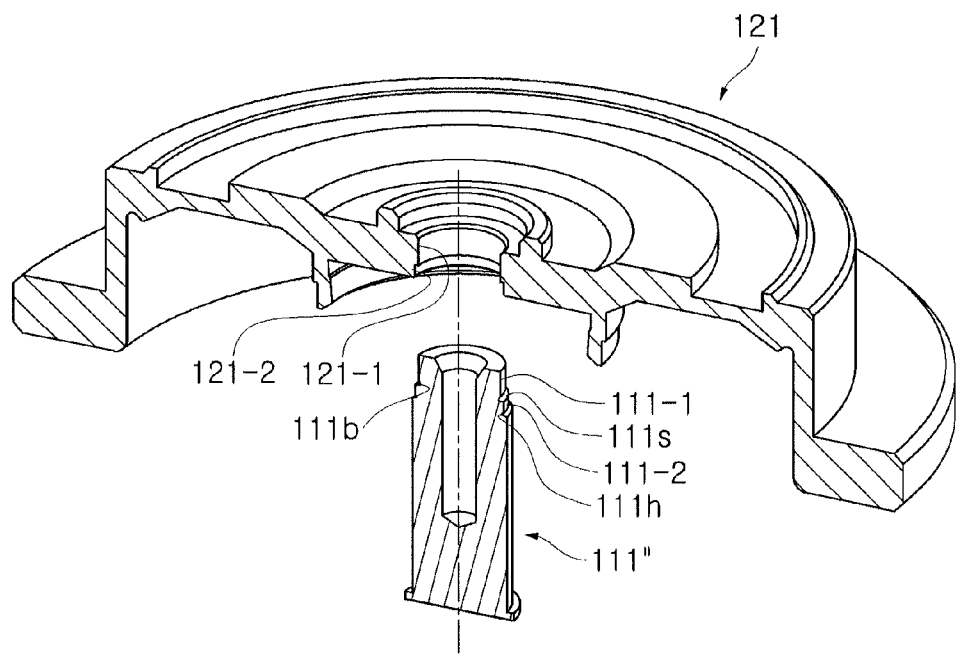
FIG. 6 is an exploded partially cut-away perspective view showing a rotating member assembly used in another embodiment of the present invention.

FIG. 5 is a schematic cross-sectional view showing a spindle motor according to another embodiment of the present invention; and FIG. 6 is an exploded perspective view showing a rotating member assembly used in another embodiment of the present invention.

Referring to FIGS. 5 and 6, a spindle motor 300 according to another embodiment of the present invention may include the hydrodynamic bearing assembly 110 including a shaft 111" and the sleeve 112, the rotor 120 including the rotor hub 121, and the stator 130 including the core 131 having the coil 132 wound therearound.

The spindle motor 300 according to this embodiment of the present invention has substantially the same configuration as that of the spindle motor 100 according to the aforementioned embodiment of the present invention, except for a coupling part between the shaft and the rotor hub. Therefore, a detailed description thereof will be omitted. Hereinafter, features different from those described in the aforementioned embodiment of the present invention will be mainly described.

In the spindle motor 300 according to this embodiment of the present invention, the second outer surface part 111-2 facing a lower end portion of the second inner surface part 121-2 may be provided with an avoidance unit so as to prevent contact with the lower end portion of the second inner surface part 121-2. The avoidance unit prevents contact between the lower end portion of the rotor hub 121 and the shaft 111", whereby deformation of the shape of the shaft 111" may be prevented.

Here, the avoidance unit may be an avoidance groove 111h provided in the second outer surface part 111-2 of the shaft 111" facing the lower end portion of the second inner surface part 121-2. The avoidance groove 111h may be provided in the circumferential direction along an outer circumference of the shaft 111".

Here, the second outer surface part 111-2 of the shaft 111" may have a diameter larger in a lower portion thereof than in an upper portion thereof based on the avoidance groove 111h.

Figure 7:
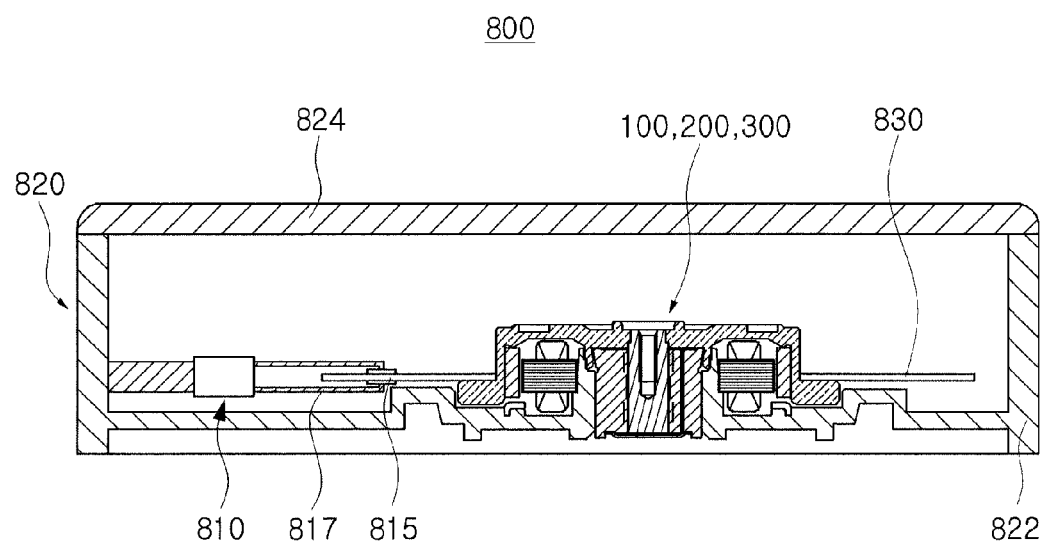
FIG. 7 is a schematic cross-sectional view of a disk drive device using the spindle motor according to the embodiment of the present invention.

FIG. 7 is a schematic cross-sectional view of a disk driving device using the spindle motor according to the embodiment of the present invention.

Referring to FIG. 7, a recording disk drive device 800 having the spindle motor 100, 200, or 300 according to the embodiment of the present invention mounted therein may be a hard disk drive device and include the spindle motor 100, 200 or 300, a head transfer part 810, and a housing 820.

The spindle motor 100, 200, or 300 may have all the characteristics of the above-described spindle motor and may have a recording disk 830 mounted thereon.

The head transfer part 810 may transfer a magnetic head 815 for reading information on the recording disk 830 mounted on the spindle motor 100, 200, or 300 to a surface of the recording disk of which the information is to be read.

Here, the magnetic head 815 may be disposed on a support part 817 of the head transfer part 810.

The housing 820 may include a motor mounting plate 822 and a top cover 824 shielding an upper portion of the motor mounting plate 822 in order to form an internal space receiving the spindle motor 100, 200, or 300 and the head transfer part 810 therein.

As set forth above, in a spindle motor according to the embodiments of the present invention, a coupling structure between a shaft and a rotor hub is changed to significantly reduce axial force applied to the shaft, whereby fractures or deformation of the shaft may be effectively prevented.

While the present invention has been shown and described in connection with the embodiments, it will be apparent to those skilled in the art that modifications and variations can be made without departing from the spirit and scope of the invention as defined by the appended claims.

What is claimed is:

1. A rotating member assembly comprising:
   a shaft including an outer surface step part provided in an outer surface thereof; and
   a rotor hub including an insertion hole into which the shaft is inserted, the insertion hole including an inner surface step part provided in an inner surface thereof and corresponding to the outer surface step part, such that the inner surface step part and the outer surface step part are fittingly-coupled to each other,
   wherein the outer surface of the shaft is divided into a first outer surface part on all part of an upper portion thereof and a second outer surface part on a lower portion thereof, based on the outer surface step part,
   the inner surface of the rotor hub is divided into a first inner surface part on an upper portion thereof and a second inner surface part on a lower portion thereof, based on the inner surface step part,
   the first outer surface part is fittingly-coupled to the first inner surface part and the second outer surface part is fittingly-coupled to the second inner surface part,
   the second outer surface part has a diameter larger than the first inner surface part, and
   the shaft and the rotor hub include an adhesive provided therebetween.

2. The rotating member assembly of claim 1, wherein the second outer surface part facing a lower end portion of the second inner surface part is provided with an avoidance unit so as to prevent contact with the lower end portion of the second inner surface part.

3. The rotating member assembly of claim 2, wherein the avoidance unit is an avoidance groove provided in the second outer surface part facing the lower end portion of the second inner surface part.

4. The rotating member assembly of claim 3, wherein the second outer surface part has the same diameter in upper and lower portions based on the avoidance groove.

5. The rotating member assembly of claim 3, wherein the second outer surface part has a diameter larger in a lower portion thereof than in an upper portion thereof, based on the avoidance groove.

6. The rotating member assembly of claim 1, wherein the second outer surface part facing a lower end portion of the second inner surface part is provided with an additional step part so as to prevent contact with the lower end portion of the second inner surface part.

7. The rotating member assembly of claim 6, wherein the second outer surface part has a diameter larger in an upper portion thereof than in a lower portion thereof, based on the additional step part.

8. The rotating member assembly of claim 1, wherein the shaft and the rotor hub include an adhesive provided therebetween.

9. The rotating member assembly of claim 1, wherein a lower end portion of the first outer surface part is provided with a collection groove collecting an adhesive.

10. A spindle motor comprising:
    the rotating member assembly of claim 1; and
    a sleeve having a shaft hole so that the shaft of the rotating member assembly is rotatably fitted thereinto, and forming a bearing clearance with the shaft, the a bearing clearance filled with a lubricating fluid.

* * * * *

UNITED STATES PATENT AND TRADEMARK OFFICE
CERTIFICATE OF CORRECTION

| | | |
|---|---|---|
| PATENT NO. | : 8,754,555 B2 | Page 1 of 1 |
| APPLICATION NO. | : 13/530955 | |
| DATED | : June 17, 2014 | |
| INVENTOR(S) | : Kim et al. | |

It is certified that error appears in the above-identified patent and that said Letters Patent is hereby corrected as shown below:

In the Claims

Column 10, Line 33, in Claim 10, delete "the a" and insert -- the --, therefor.

Signed and Sealed this
Ninth Day of September, 2014

Michelle K. Lee
*Deputy Director of the United States Patent and Trademark Office*